UNITED STATES PATENT OFFICE.

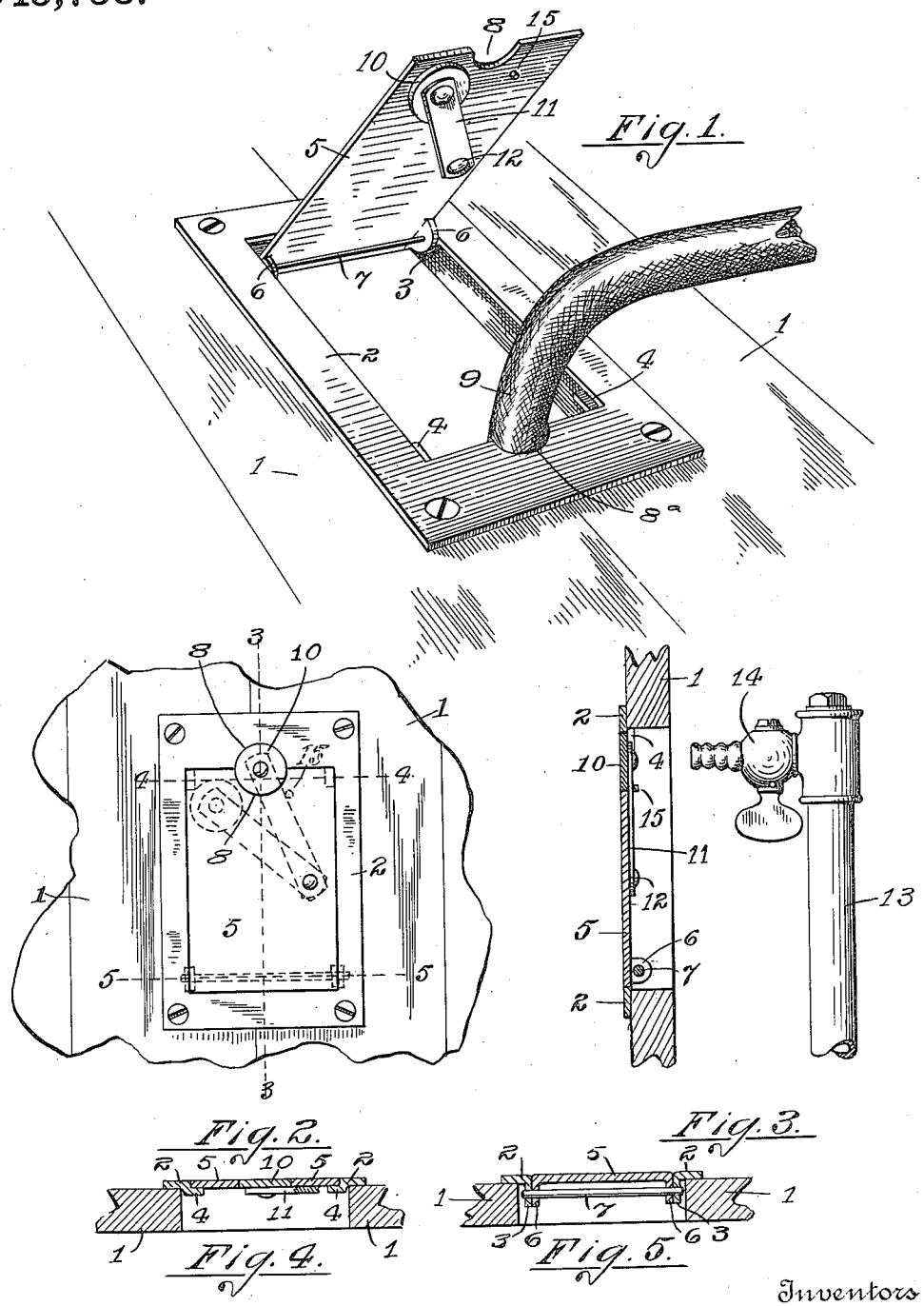

GLENN R. CHAMBERLAIN, ALBERT G. SCHROEDER, AND ARCHIBALD A. McLEOD, OF GRAND RAPIDS, MICHIGAN; SAID McLEOD ASSIGNOR TO SAID CHAMBERLAIN AND SCHROEDER.

CLOSURE FOR HOSE-PIPE CONNECTIONS.

945,753.     Specification of Letters Patent.     Patented Jan. 11, 1910.

Application filed February 2, 1909. Serial No. 475,593.

*To all whom it may concern:*

Be it known that we, GLENN R. CHAMBERLAIN, ALBERT G. SCHROEDER, and ARCHIBALD A. McLEOD, citizens of the United States of America, residing at Grand Rapids, in the county of Kent and State of Michigan, have invented certain new and useful Improvements in Closures for Hose-Pipe Connections; and we do hereby declare the following to be a full, clear, and exact description of the invention, such as will enable others skilled in the art to which it appertains to make and use the same.

Our invention relates to closures for hose pipe, electric, or other like connections, and its object is to provide a device for closing an opening or chamber in which may be located the connecting means for attaching a hose or pipe to a gas pipe or a water pipe, electric conductors or other like devices, and to provide a device for closing such opening or chamber either when the hose or other conductor is attached and extending outside the same, or when the same is removed, and it consists essentially of the combinations and arrangements, hereinafter more fully described and particularly pointed out in the claims, reference being had to the accompanying drawings, in which:

Figure 1 is a perspective of a device embodying our invention; Fig. 2 a plan view of the same on a reduced scale; Fig. 3 a vertical section of the same on the line 3—3 of Fig. 2; Fig. 4 a transverse section on the line 4—4 of Fig. 2 and, Fig. 5 the same on the line 5—5 of Fig. 2.

Like numbers refer to like parts in all of the figures.

1 represents a floor or wall of a building or other like structure having an opening therein opening into a chamber or recess in which is located a water or gas pipe, an electric conductor, or other like device to which it is desired to attach a hose or pipe 9, or other conductor, a gas pipe 13 and suitable hose cock 14 being shown in Fig. 3. Surrounding this opening is a frame 2 preferably of sheet metal having an opening therein corresponding to the opening in the floor or wall 1 and having lugs 3 bent downward within said opening, and supports 4 are also depressed within said opening to the amount of thickness of a suitable closure 5, consisting of a metal plate having lugs 6 bent downward opposite the lugs 3 and pivoted thereto by a rod 7 to form a hinge for the closure 5. The edge of the closure 5 at the end opposite the hinges thereof is provided with a semi-circular recess 8 and opposite this recess in the frame 2 is a corresponding recess 8ª, whereby when the door 5 is closed a circular opening is formed through which the hose 9 or other conductor may project. When said hose is detached and the door closed, this circular opening is closed by a disk 10 movably mounted on one end of the spring arm 11, the other end of the arm being pivoted to the door as at 12, whereby when the hose is in place the disk 10 may be swung beneath the door 5 to permit the hose to extend through the opening.

15 is a stop to prevent swinging the arm beyond the proper position to properly locate the disk in the opening.

What we claim is:—

1. A closure, comprising a frame having an opening, a door to close said opening, said frame and door having semi-circular opposing recesses to permit a hose or other conductor to extend therethrough, a movable disk for closing said recesses and adjustable means for supporting the disk in said recesses.

2. A closure, comprising a frame having an opening, a door to close said opening, said frame and door having semi-circular opposing recesses, a movable disk to close said recesses, and a flexible arm carrying the disk and pivoted to the door.

3. A closure, comprising a sheet metal frame having a rectangular opening and also having lugs turned inward and depressed supports for the door, a door to close said opening and having inwardly turned lugs opposite the lugs on the frame, a rod extending through said lugs, a semi-circular recess in the edge of the door, a corresponding recess in the frame opposite the recess in the door, a disk to close said recesses, and a flexible arm supporting the disk at one end and pivoted to the door at the other end.

4. A closure, comprising a sheet metal frame having a rectangular opening and also having lugs turned inward and depressed supports for the door, a door to close said opening and having inwardly turned lugs opposite the lugs on the frame, a rod extending through said lugs, a semi-circular recess in the edge of the door, a corresponding recess in the frame opposite the recess in the door, a disk to close said recesses, a flexible arm supporting the disk at one end and pivoted to the door at the other end, and a stop to limit the movement of the arm.

In testimony whereof we affix our signatures in presence of two witnesses.

GLENN R. CHAMBERLAIN.
ALBERT G. SCHROEDER.
ARCHIBALD A. McLEOD.

Witnesses:
GEORGIANA CHACE,
LUTHER V. MOULTON.